United States Patent [19]
Hagiwara et al.

[11] Patent Number: 5,512,968
[45] Date of Patent: Apr. 30, 1996

[54] MULTIPLE PROJECTION TELEVISION SYSTEM

[75] Inventors: Kanehiro Hagiwara; Yasushi Ichihara; Mitsuyoshi Mitake; Takashi Furuno; Saori Kishida; Jun Iizuka; Youichi Fujikawa, all of Tokyo, Japan

[73] Assignee: Pioneer Electronic Corporation, Tokyo, Japan

[21] Appl. No.: 458,815

[22] Filed: Jun. 2, 1995

[30] Foreign Application Priority Data

Aug. 6, 1994 [JP] Japan ................................... 6-126622
Aug. 6, 1994 [JP] Japan ................................... 6-126623

[51] Int. Cl.⁶ .................................................. G03B 21/00
[52] U.S. Cl. ................................. 353/094; 353/74; 353/72
[58] Field of Search ............................. 353/94, 74, 79, 353/72, 76; 359/449, 453, 456, 460; 348/836, 839, 840, 843

[56] References Cited

U.S. PATENT DOCUMENTS 5,011,277  4/1991  Ogino et al. ............................. 353/94
5,206,760  4/1993  Nakashima et al. .................... 348/839
5,363,149  11/1994  Furuno et al. ......................... 359/456
5,382,990  1/1995  Hata ......................................... 353/94

FOREIGN PATENT DOCUMENTS

0383036  4/1991  Japan ...................................... 353/74

Primary Examiner—William C. Dowling
Attorney, Agent, or Firm—Nikaido, Marmelstein, Murray & Oram

[57] ABSTRACT

A multiple projection television system is comprised of a plurality of projection units stacked in matrix to form a large television screen. Each of the projection units has a cabinet, a projector provided in the cabinet, and a screen secured to a front portion of the cabinet. A mounting frame is provided in the cabinet for slidably mounting the projector in forward and rearward directions. A back of the cabinet is opened so as to allow removing of the projector from the cabinet. The screen is detachably secured to the cabinet so as to allow removing of the projector from the cabinet.

6 Claims, 15 Drawing Sheets

PRIOR ART

PRIOR ART

FIG.20

PRIOR ART

MULTIPLE PROJECTION TELEVISION SYSTEM

BACKGROUND OF THE INVENTION

The present invention relates to a multiple projection television system.

A multiple projection television system has been proposed to provide a large display.

Figure 16:
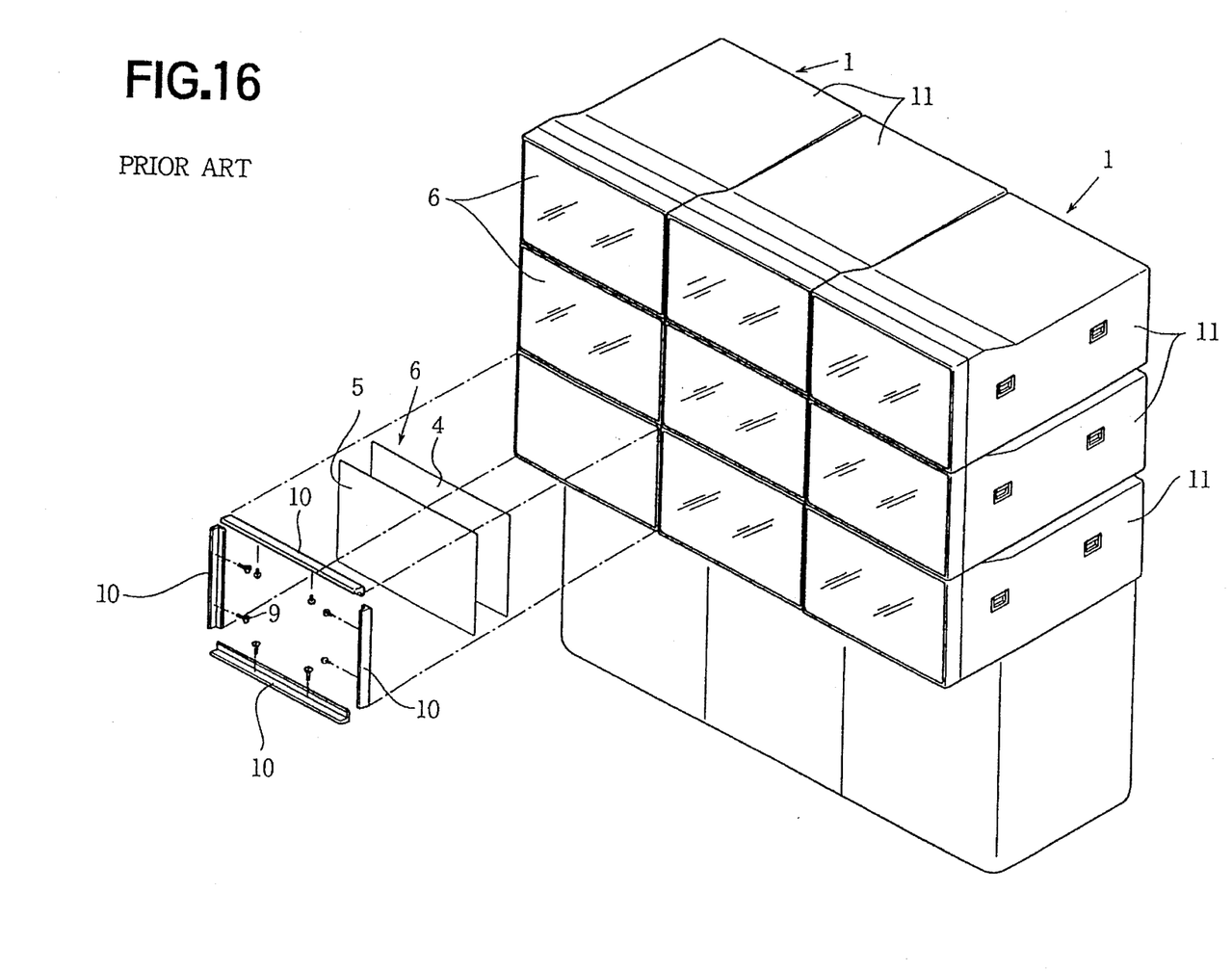
FIG. 16 is a perspective view showing a conventional multiple projection television system.
Figure 17:
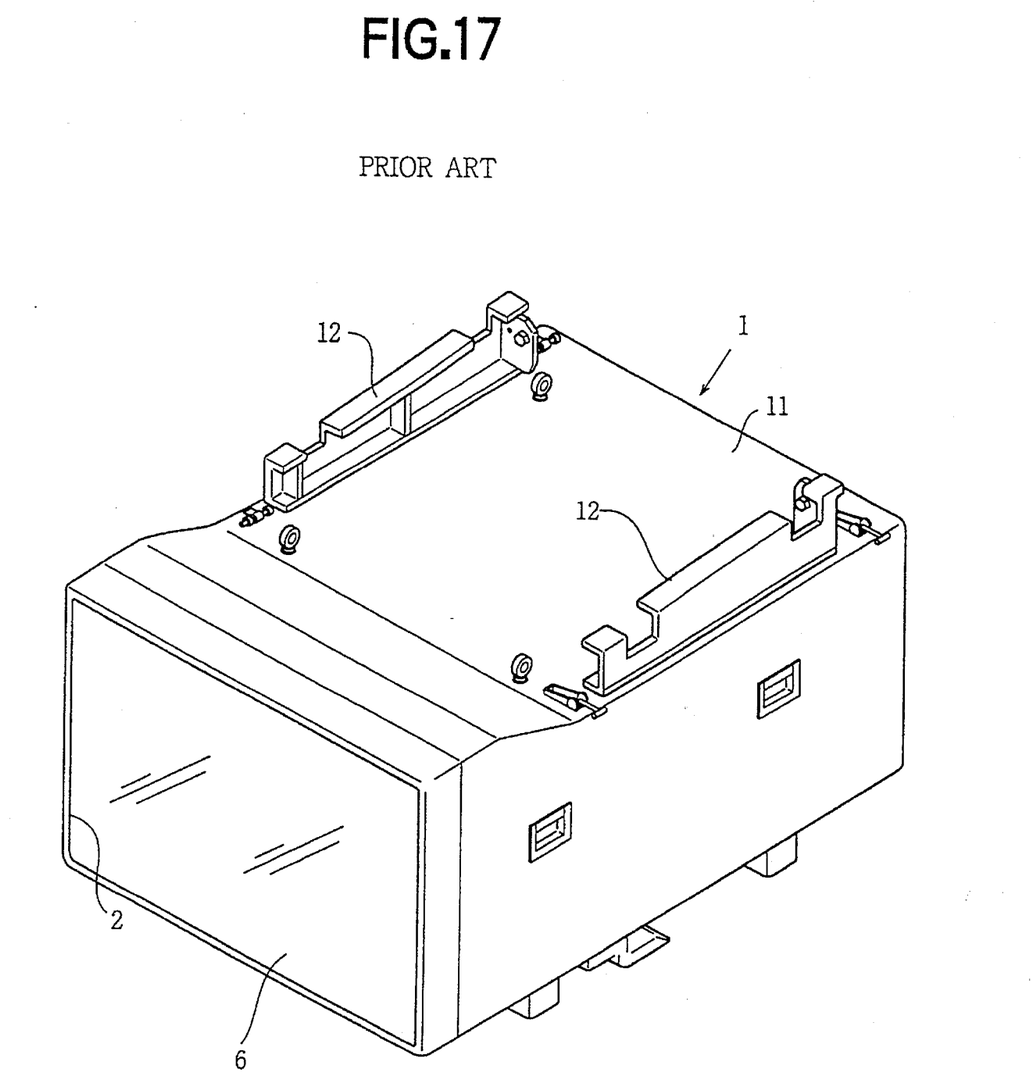
FIG. 17 is a perspective view showing a projection unit of the conventional system.
Figure 19:
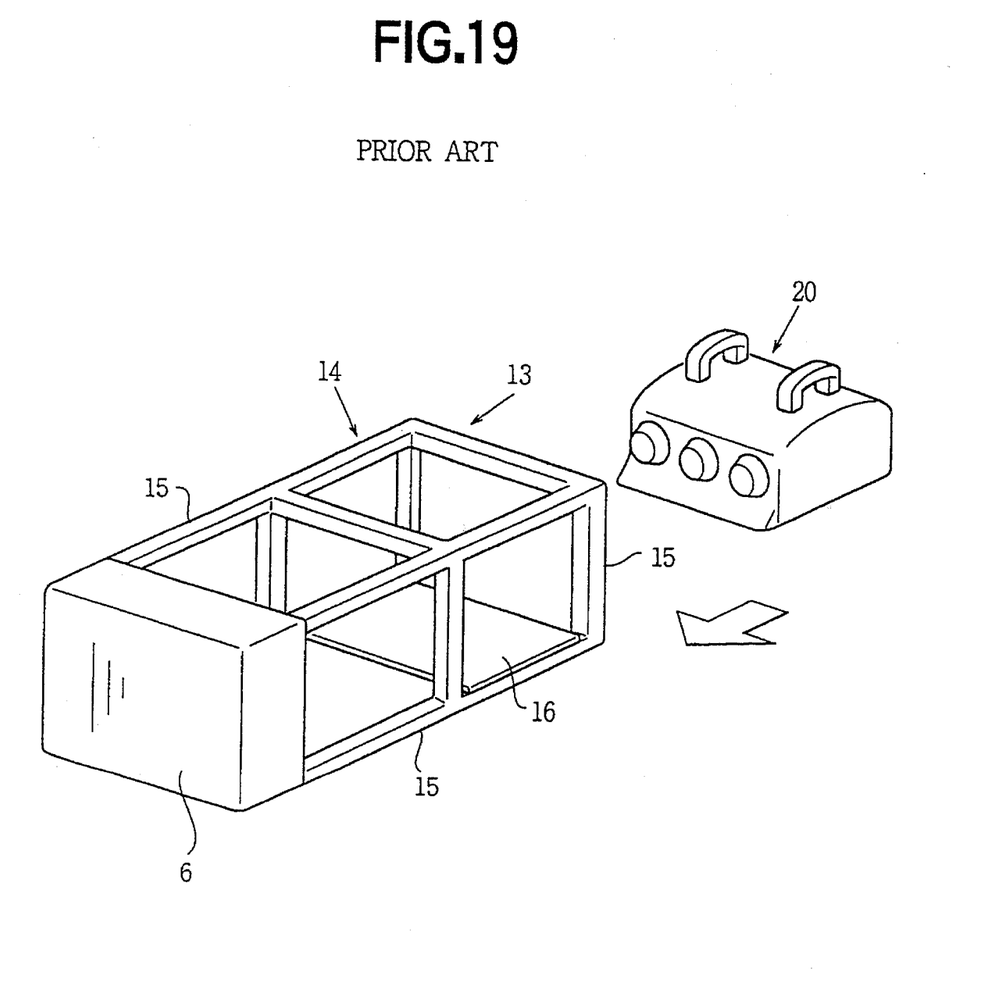
FIG. 19 is a perspective view showing another conventional projection unit.

FIG. 16 shows a conventional multiple projection television system. A plurality of projection units 1 are disposed in matrix to form a large display. As shown in FIG. 17, each projection unit 1 comprises a cubic casing 11 made of aluminum, a screen 6 secured to an opening member 2 provided in front of the casing 11, and a projector, such as a projector 20 shown in FIG. 19, provided in the casing 11 at a rear portion thereof. The projector comprises a trio of CRT projection tubes providing RGB images directed to the screen 6. The projector is mounted in the casing 11 at the rear.

The screen 6 comprises a Fresnel lens 4 and a lenticular sheet 5. The screen 6 is attached to the opening 2 of the casing 11 with four support frames 10 and screws 9.

Figure 18:
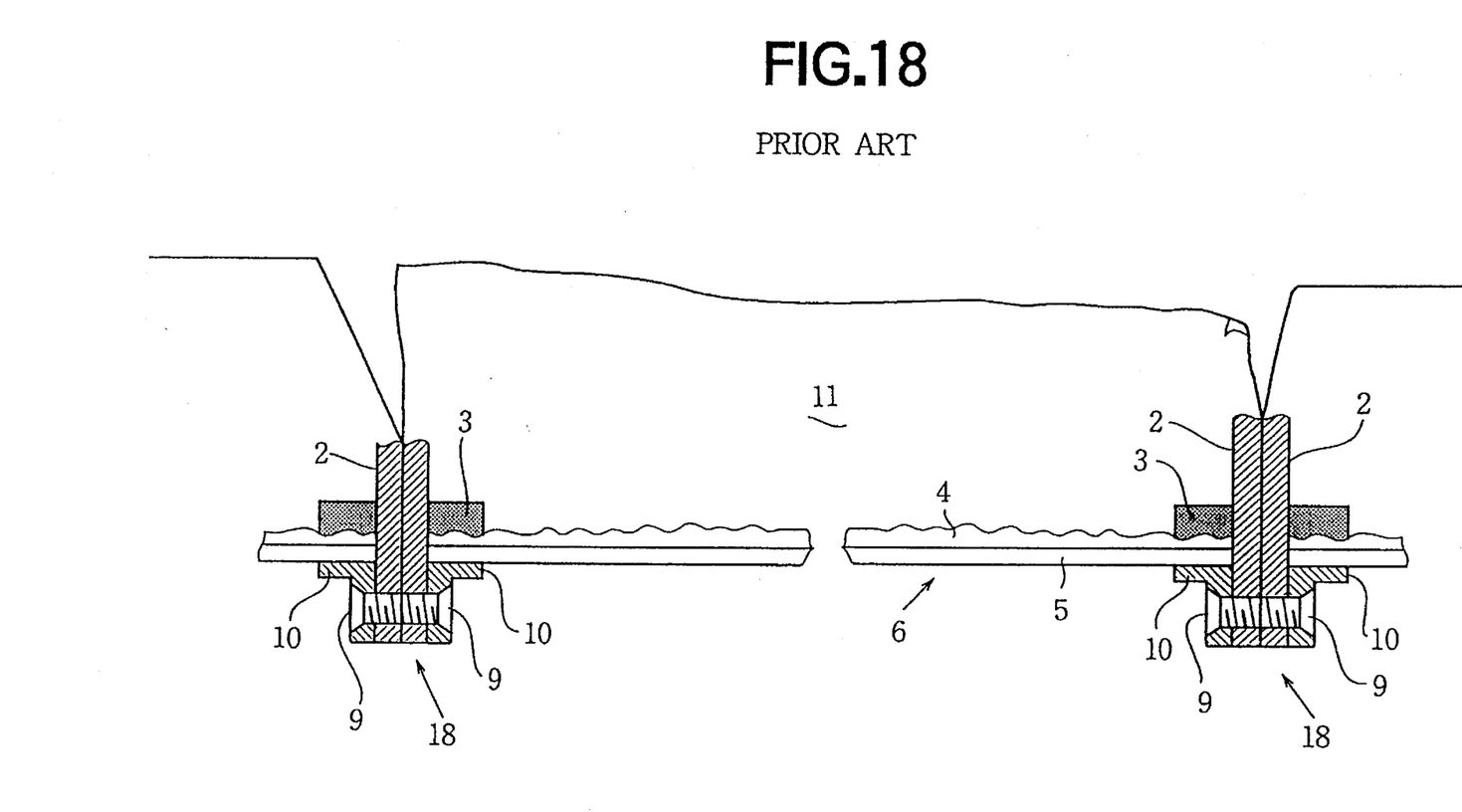
FIG. 18 is a sectional view showing a mounting structure of a screen of the conventional system.

FIG. 18 shows a bordering frame 18 between adjacent screens, which acts as a mounting structure of the screen 6 to the casing 11. The bordering frame 18 comprises opening members 2, a pair of stoppers 3 and support frames 10. The stopper 3 is secured to an inner peripheral portion of each of four sides of the opening member 2. The outer periphery of the screen 6 is mounted on the stopper 3. The support frame 10 is mounted on the screen 6 corresponding to the stopper 3, and secured to walls of the opening member 2 with screws 9. Thus, the screen 6 is secured to the casing 11, interposed between the stoppers 3 and support frames 10.

When the screen 6 is to be removed from the casing 11, all of the screws 9 and the support frames 10 are removed from the casing.

In such a structure, external parts such as screws and frames are needed, thereby increasing the weight of the casing 11. Accordingly, it is inconvenient to carry the projection unit 1. Furthermore, it is difficult to maintain the projection unit in a setting state.

FIG. 19 shows another conventional projection unit comprising a plurality of frames, thereby solving the above mentioned disadvantages. A projection unit 13 comprises a cabinet 14 comprising a plurality of frame members 15. The screen 6 is secured to a front portion of the cabinet 14. A base plate 16 for the projector 20 is provided between lower frame members 15 at a rear portion of the cabinet.

Figure 20:
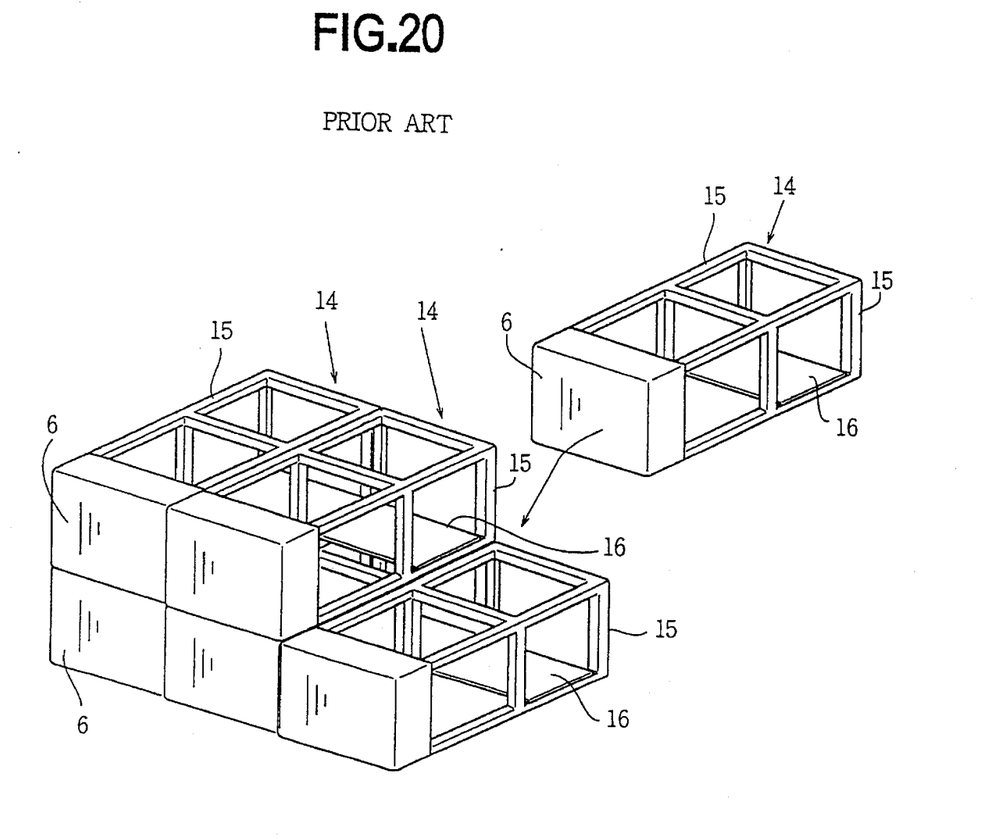
FIG. 20 is a perspective view showing another conventional multiple projection television system having a plurality of projection units of FIG. 19.
Figure 21:
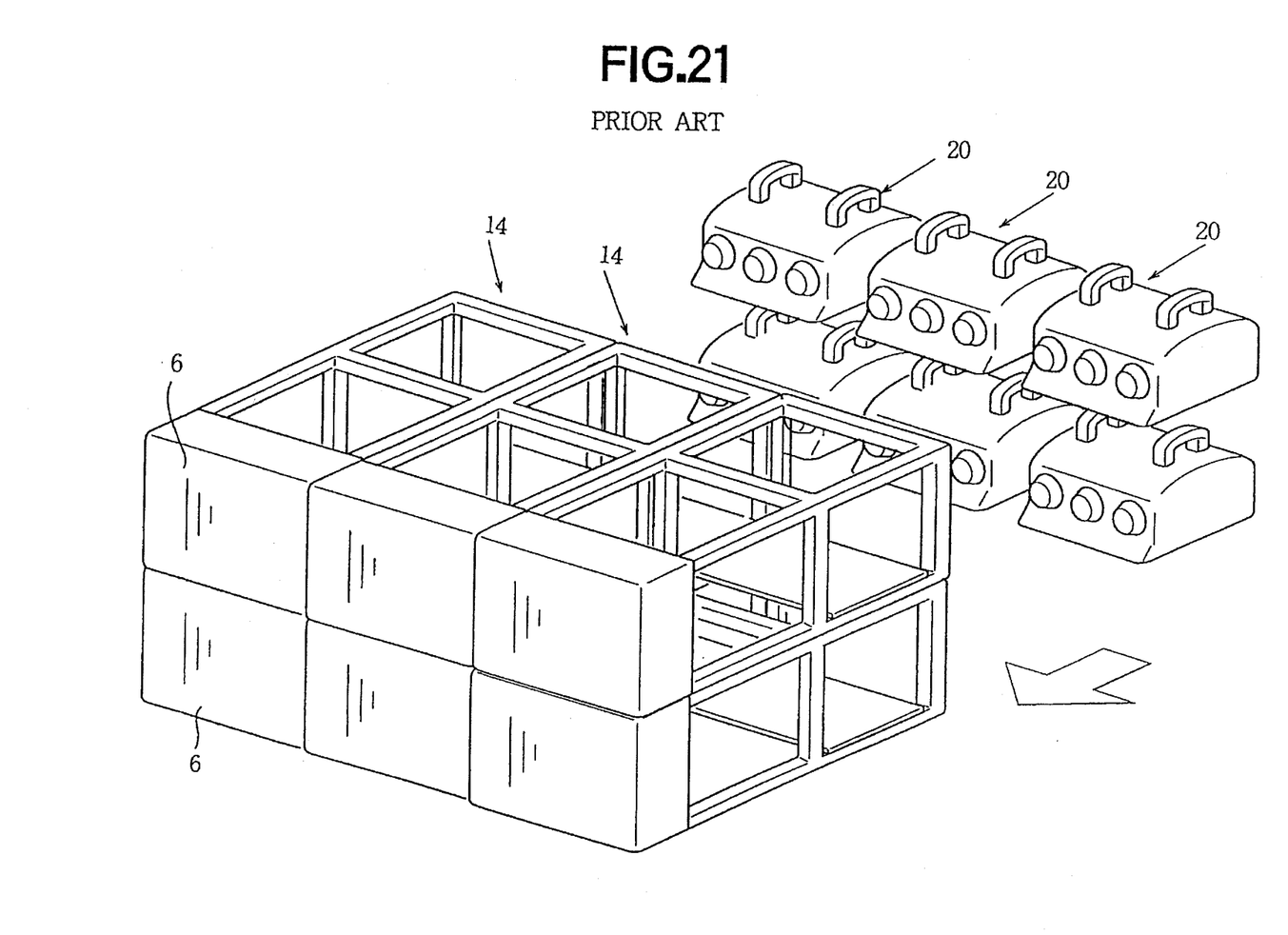
FIG. 21 is a perspective view showing the conventional multiple projection television system of FIG. 20.

As shown in FIG. 20, a plurality of cabinets 14 are mounted in matrix. Thereafter, the projector 20 is inserted in each cabinet 14 from the rear and mounted on the base plate 16 as shown in FIG. 21.

In the projection unit, it is necessary to provide a predetermined distance between the screen 6 and the projector 20 for obtaining a proper optical path length. Therefore, the projector 20 is disposed at the rear portion, and it is preferable to insert the projector at the rear.

If there is no space behind the jointed cabinets 14, since the screen 6 can be removed from the cabinet 14 by removing screws 9 and support frames 10, the projector 20 is inserted at the front of the cabinet. In such a mounting operation, it is necessary to carry the projector 20 in the cabinet 14 to the base plate 16 at the rear portion. The projector 20 is usually at 30 to 60 kg in weight, and the optical path length is about 700 mm from the screen 6. Therefore, it is essentially impossible the mount the projector in the cabinet 14 at the front. Furthermore, the projector 20 may damage the frame members 15 each of which has a thin thickness.

In the multiple projection television system, it is important to reduce the width of the bordering frame 18 between the screens. However, in the above mentioned system, the width of the bordering frame is determined by the widths of the adjacent support frames 10. As a result the width of the bordering frame can not be reduced.

Since four sides of the screen 6 are supported by support frames 10 and screws 9, the number of screws 9 is large.

It is necessary to remove all of the support frames 10 for removing the screen 6, causing the number of steps of the process to increase.

SUMMARY OF THE INVENTION

An object of the present invention is to provide a multiple projection television system where a projector having a comparatively heavy weight is easily mounted in a cabinet either at the front or the rear hereof.

Another object of the present invention is to provide a system where a bordering frame between screens is reduced in width.

A further object of the present invention is to provide a system where the number of parts thereof is reduced and a mounting operation of the screen is simplified.

According to the present invention, there is provided a multiple projection television system comprised of a plurality of projection units stacked in matrix to form a large television screen, comprising each of the projection units having a cabinet, a projector unit provided in the cabinet, and a screen secured to a front portion of the cabinet, a mounting frame provided in the cabinet for slidably mounting the projector unit in forward and rearward directions, a back of the cabinet being opened so as to allow removing of the projector from the cabinet, and the screen being detachably secured to the cabinet so as to allow removing of the projector from the cabinet.

The other objects and features of this invention will become understood from the following description with reference to the accompanying drawings.

DETAILED DESCRIPTION OF THE PREFERRED EMBODIMENT

Figure 1:
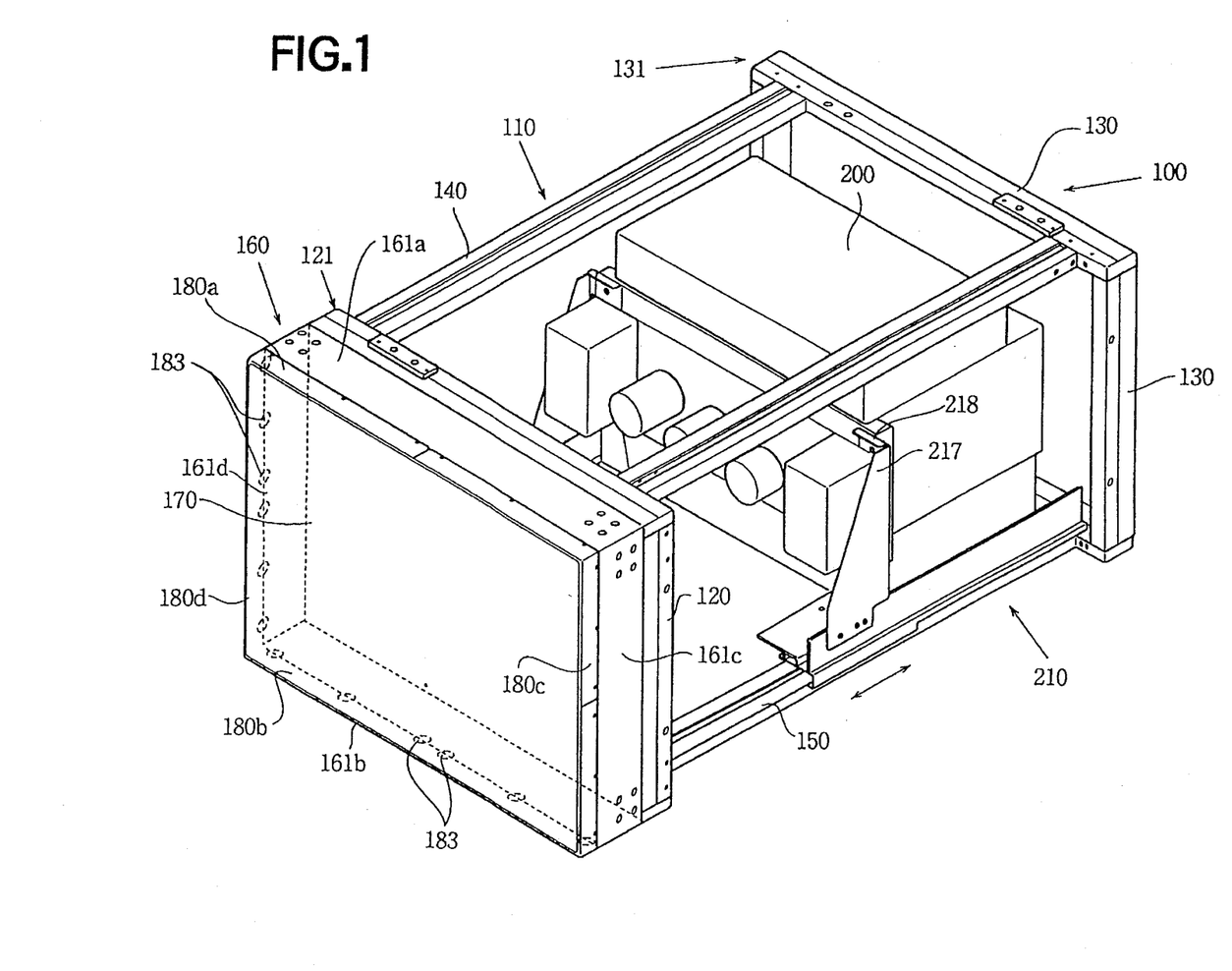
FIG. 1 is a perspective view showing a projection unit of a multiple projection television system according to the present invention.

Referring to FIG. 1, a projection unit 100 of the present invention comprises a cabinet 110 made by a plurality of frames and members. The frames comprise a rectangular front frame 121 having four frame members 120, a rectangular rear frame 131 having four frame members 130, a pair of upper frame members 140 and a pair of lower frame members 150 which are provided in parallel with each other and between the front frame 121 and the rear frame 131. A screen support frame 160 comprising four frame members 161a, 161b, 161c and 161d is secured to the front frame 121 for supporting a screen 170. On the frame members 161a, 161b, 161c and 161d, holder frames 180a, 180b, 180c and 180d are respectively mounted for holding the screen 17 to the support frame 160.

A projector table 210 is provided on the lower frame members 150 to be slid in the directions shown by the arrows. A projector 200 is mounted on the table 210.

Figure 2:
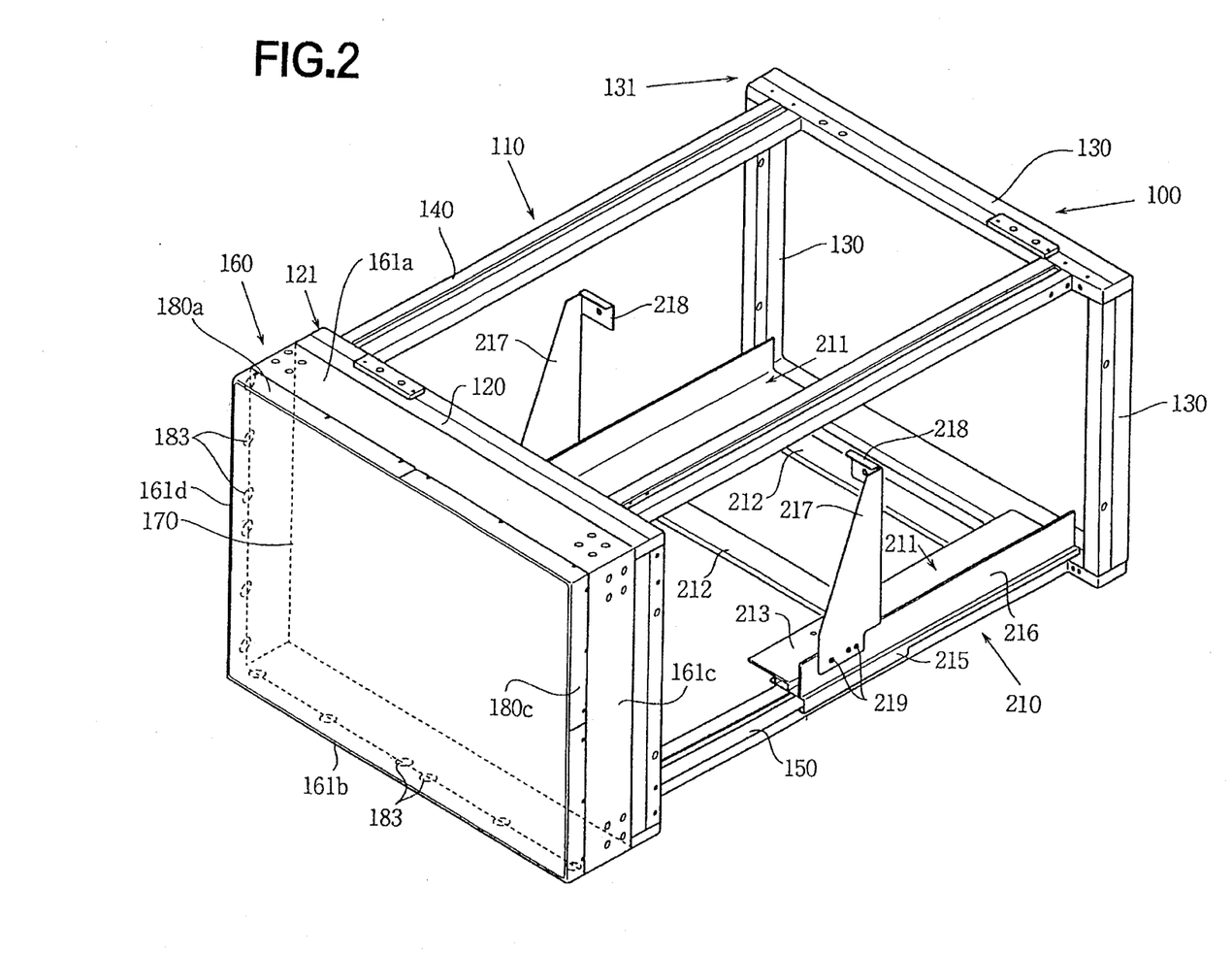
FIG. 2 is a perspective view showing a cabinet of the projection unit.

Referring to FIG. 2., the table 210 comprises a pair of sliders 211 slidably mounted on the opposite lower frame members 150, respectively, and a pair of ribs 212 laterally provided between the sliders 211.

Figure 3:
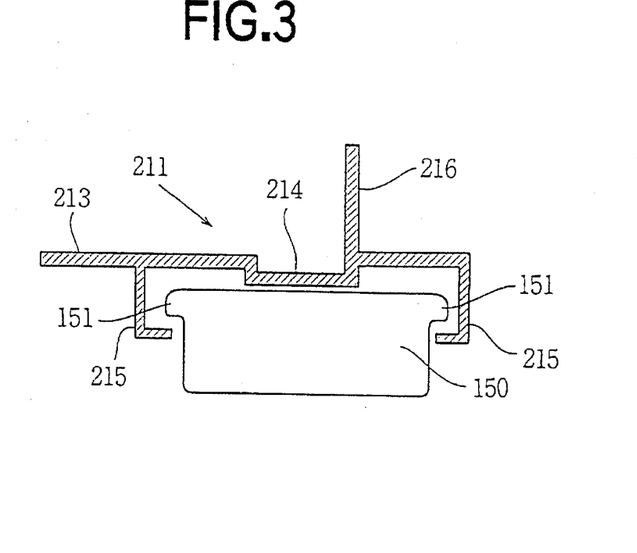
FIG. 3 is a schematic sectional view showing a part of a table of the cabinet.

Referring to FIG. 3, each of the sliders 211 comprises a table portion 213 on which the projector 200 is mounted, a recessed mounting portion 214 slidably mounted on the lower frame member 150, a pair of engaging lugs 215 engaged with projections 151 of the lower frame member 150, and a side plate 216. As shown in FIG. 2, a positioning plate 217 having a clamp portion 218 is detachably secured to the side plate 216 with screws 219. The clamp portion 218 is provided for clamping the projector 200 so as to fix the projector on the table 210.

In the slider, the mounting portion 214 is recessed to form a small contact area with the lower frame member 150. Furthermore, lubricating oil is provided between the lower frame member 150 and the mounting portion 214. Thus, sliding friction of the table 210 is reduced, so that the table having a comparatively heavy projector is smoothly slidable on the lower frame members 150.

The lower frame member 150 has a stopper (not shown) to stop the movement of the table 210 in the forward direction of the cabinet when the slider 211 abutted on the stopper.

Figure 4:
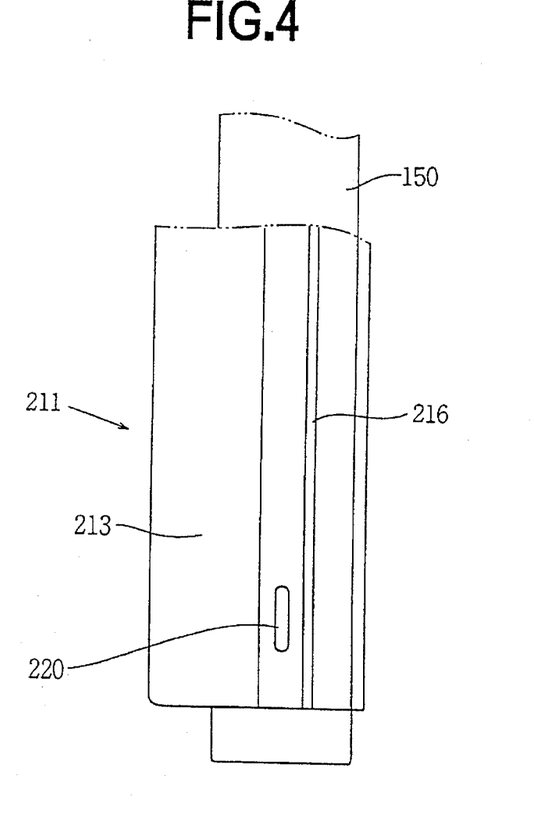
FIG. 4 is a plan view showing a part of the table.

Referring to FIG. 4, the slider 211 further has an elongated slit 220 formed on the recessed mounting portion 214 at a rear portion in order to finely adjust the optical path length. A threaded hole (not shown) is formed on the lower frame member 150 corresponding to the slit 220. When the table 210 is positioned on the lower frame member 150 at a proper optical path length, the table 210 is secured to the lower frame members 150 by engaging a screw in the slit 220 and the threaded hole. Consequently, the optical path length is provided.

Figure 5:
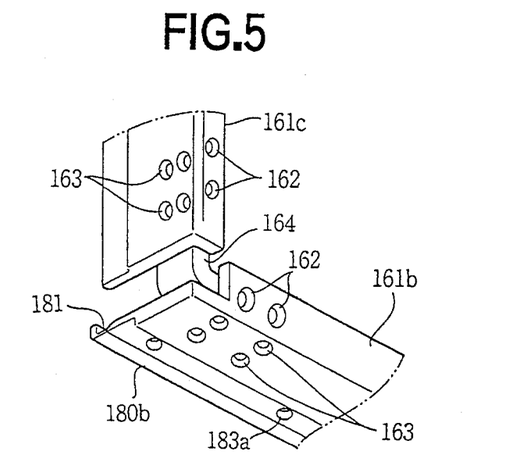
FIG. 5 is a perspective view showing a part of frame members of the cabinet.

FIG. 5 shows a part of the frame members 161b and 161c of the support frame 160. Each frame member has threaded holes 162 and 163 formed at end portions. The adjacent frame members are connected to each other at end potions with a corner bracket 164 by engaging screws with threaded holes.

Figure 6:
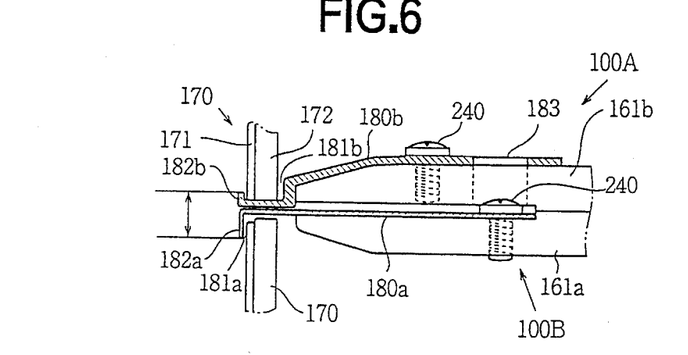
FIG. 6 is a sectional side view partly showing a screen attached to the cabinet.
Figure 7:
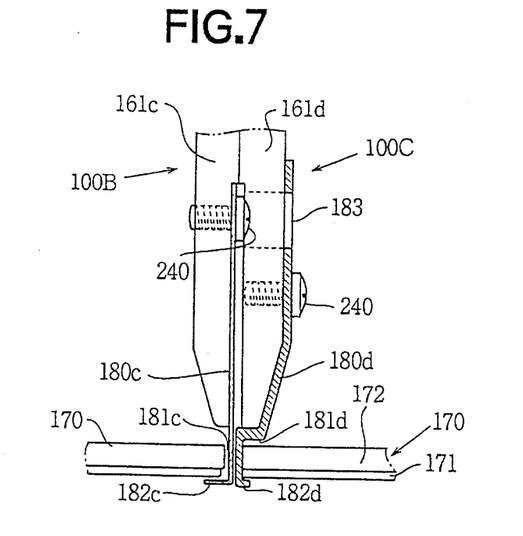
FIG. 7 is another sectional side view partly showing the screen attached to the cabinet.
Figure 8:
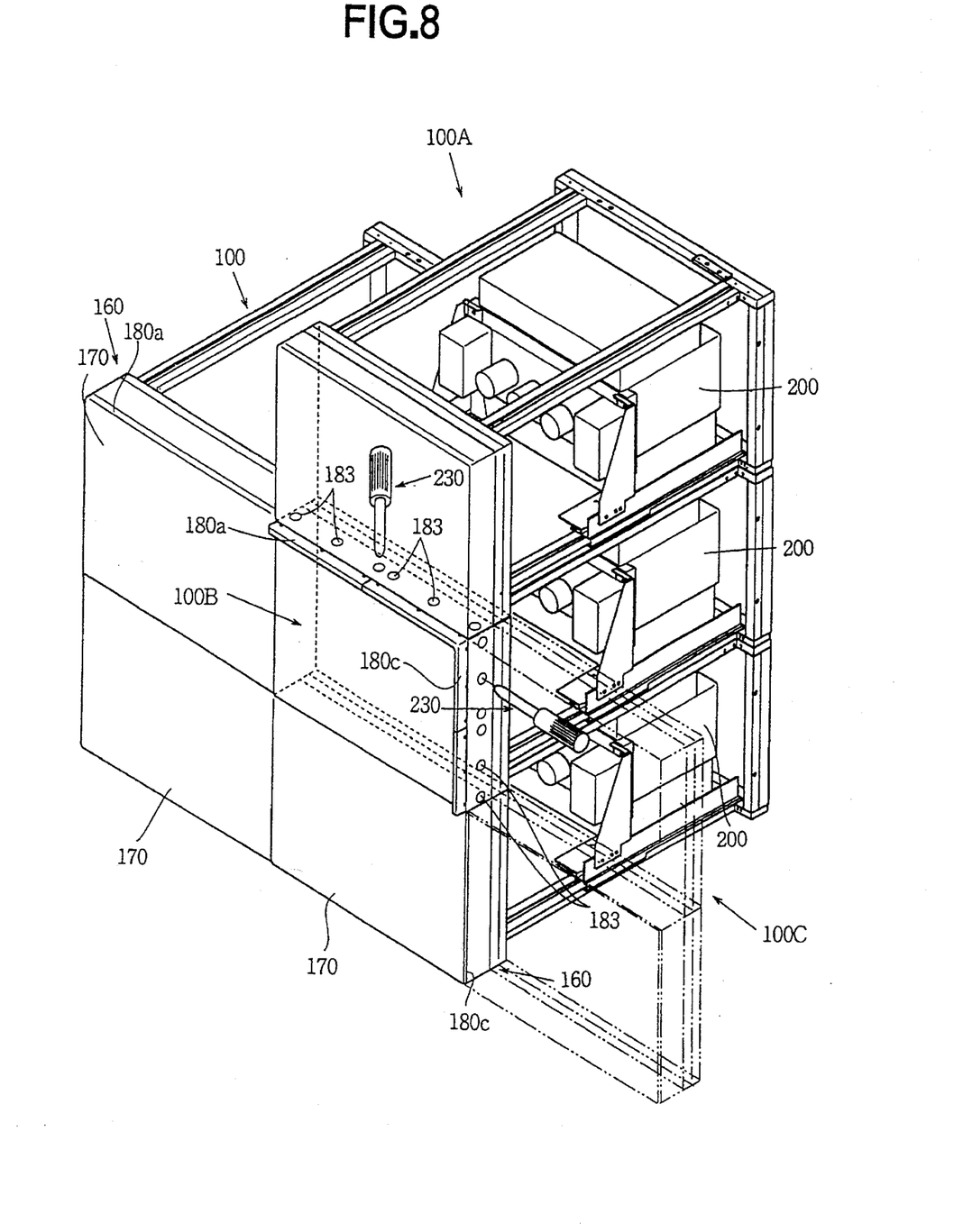
FIG. 8 is a perspective view partly showing the multiple projection television system of the present invention.

FIGS. 6 and 7 show mounting structures of the screen 170 to the support frame 160 through the holder frames 180a to 180d FIG. 8 shows a part of a multiple projection television system of the present invention having a plurality of projection units 100 jointed in matrix. Before the projection units 100 are mounted in matrix, the screen 170 is attached to each projection unit.

FIG. 6 shows the mounting structures of the screens 170 at a lower side of the projection unit 100A and an upper side of the projection unit 100B. FIG. 7 shows the mounting structures of the screens 170 at the right side of the projection unit 100B and the left side of the projection unit 100C. Similarly to the conventional system, the screen 170 comprises a lenticular sheet 171 and a Fresnel lens 172.

The holder frames 180a to 180d comprise a pair of detachable frames 180a and 180c and a pair of fixed frames 180b and 180d.

The detachable holder frames 180a and 180c are detachably engaged with outer portions of the frame members 161a and 161c, respectively with screws 240.

The detachable holder frames 180a and 180c have engaging projections 181a and 181c to be projected from the front ends of the frame members 161a and 161c, and engaging lugs 182a and 182c formed to be largely bent at the ends of the engaging projections 181a and 181c, respectively.

The fixed holder frames 180b and 180d are fixedly engaged with inner portions of the frame members 161b and 161d, respectively with screws 240. The fixed holder frames 180b and 180d have engaging projections 181b and 181d to be projected from the front ends of the frame members 161b and 161d, and engaging lugs 182b and 182f formed to be slightly bent at the ends of the engaging projections 181b and 181d, respectively.

Four peripheral sides of the screen 170 are engaged with the engaging projections 181a to 181d and held in the engaging lugs 182a to 182d, respectively.

Figure 9:
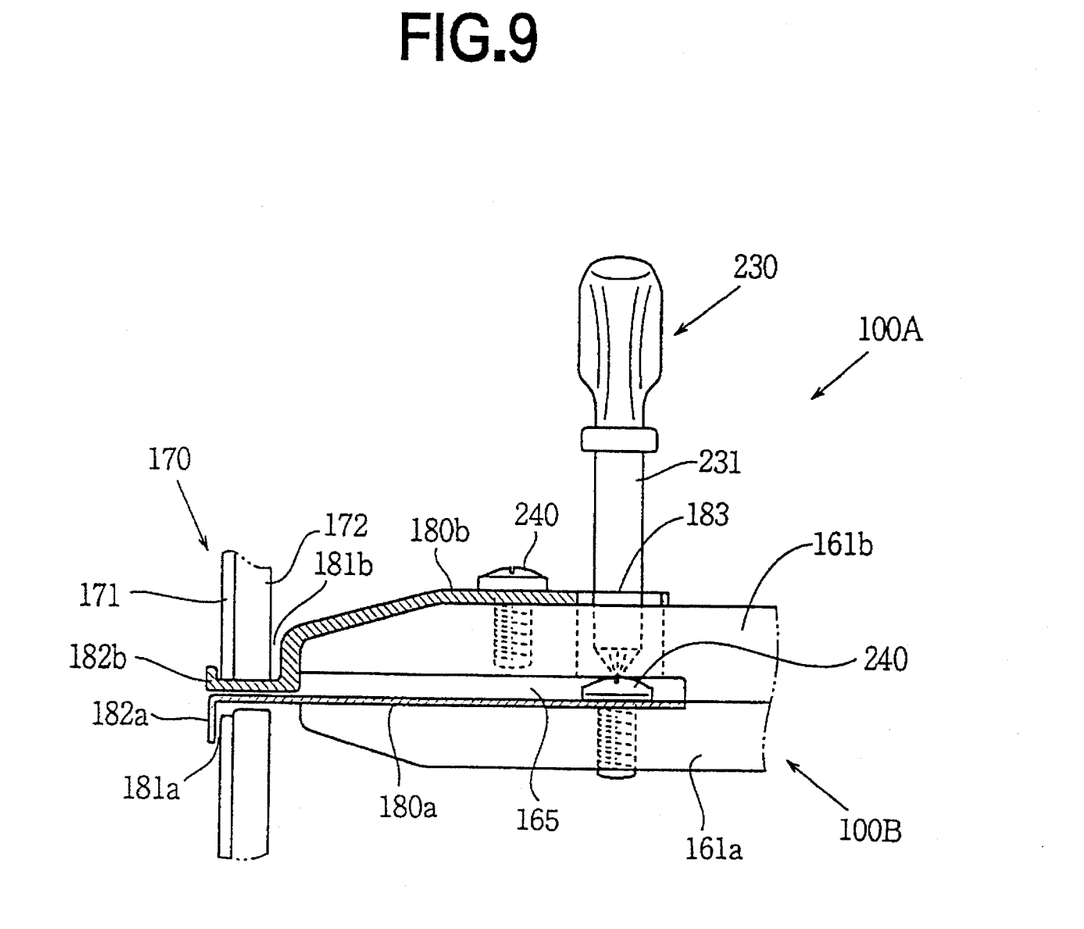
FIG. 9 is an explanatory view showing a mounting operation of the screen on the cabinet.

Each of the frame members 161b and 161d, and fixed holder members 181b and 181d has an opening 183 formed corresponding to the screws 240 secured to the detachable holder frames 180a and 180c which are engaged with the frame members 161a and 161c. The opening 183 has a diameter larger than that of a head of the screw 240 so that a shank 231 of a screwdriver 230 can be inserted into the opening as shown in FIG. 9. Thus, the screws 240 of the detachable holder frames 181a and 181c are loosen and tighten by the driver 230 through the openings 183.

As shown in FIG. 9, a space 165 is provided between the frame members 161b and 161a of the adjacent cabinets for the detachable holder frame 181a and the screw 240.

Figure 10:
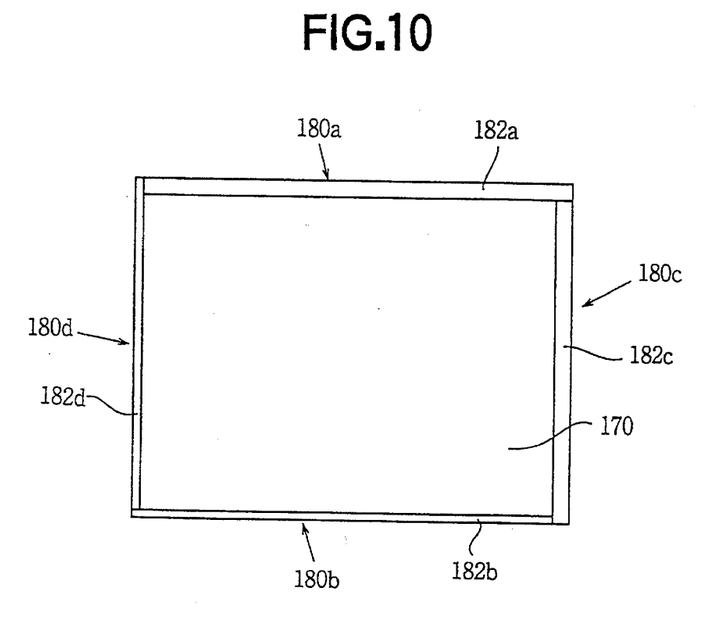
FIG. 10 is a plan view showing the screen.

FIG. 10 shows the engaging lugs 182a to 182d of the holder frames 180a to 180d which form a bordering frame of the screen of each projection unit. The width of each of the engaging lugs 182b and 182d at left and lower sides is formed smaller than the width of each of the engaging lugs 182a and 182c at upper and right sides.

As shown in FIG. 6, the lower periphery of the screen 170 is abutted on the engaging projection 181b of the fixed holder frame 180b by own weight. Similarly, the left side periphery of the screen 170 is adapted to abut on the engaging projection 181d of the fixed holder frame 180d as shown in FIG. 7. Thus, the widths of the engaging lugs 182b and 182d can be reduced.

However, the screen 170 may expand and contact in accordance with temperature and moisture in the cabinet. Thus, upper and right side peripheries of the screen 170 are apart from the respective engaging projections 181a and 181c of the detachable holder frames 180a and 180c with gaps. Thus, each of the engaging lugs 182a and 182c is formed to have a large width.

Mounting processes of the screen 170 and the projector 200 will be described hereinafter.

As aforementioned, the screen 170 is secured to the cabinet 110 before mounting. The cabinets 110 are stacked in matrix and the projectors 200 are mounted in the respective cabinets as shown in FIG. 8, whereby the multiple projection television system is formed.

In this state, the weight of a body of a cabinet including a projector of an upper cabinet is exerted on a body of a cabinet of a corresponding lower cabinet. Accordingly, the lower cabinet in not moved. Thus, the screen can be easily removed from the cabinet.

Figure 11:
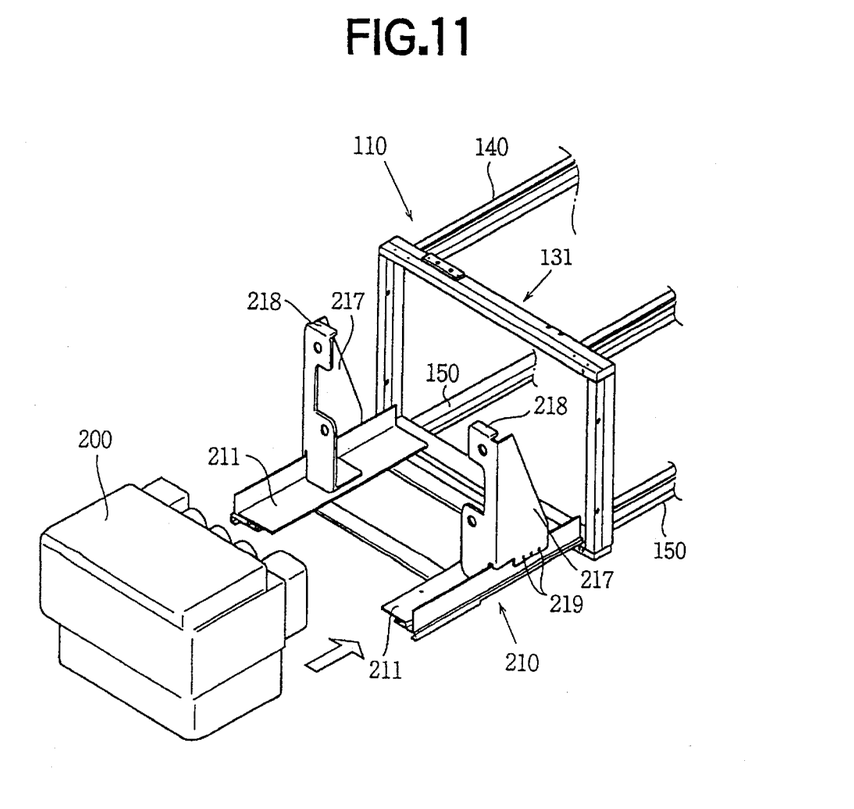
FIG. 11 is an explanatory view showing a projector mounted in the cabinet at the rear.

If there is a space on the rear portion of the stacked cabinets, the projector of each unit is mounted in the cabinet from the rear. As shown in FIG. 11, the table 210 is pulled out of the rear frame 131, the projector 200 is mounted on the sliders 211 of the table 210 and the front portion of the projector is engaged with the positioning plates 217 and secured to the clamp portions 218 by screws. Thereafter, the table 210 is pushed in the cabinet to the stoppers of the lower frame members 150.

Since the lubricating oil is provides between the lower frame members 150 and the sliders 211, the sliding operations of the table in the backward and forward directions are smoothly performed.

After the optical path length is adjusted, the screw is engaged with the slit 220 of the mounting portion 214 and the threaded hole of the lower frame member 150 so that the table 210 is secured to the frame members 150.

If the system is disposed adjacent a wall of the place without a space, the projector 200 can not be mounted from the rear. In this case, the projector is mounted from the front. Since the inside of the cabinet 110 is hollow, the screen 170 attached to the support frame 160 of the cabinet 110 is removed from the support frame at the inside of the cabinet.

In the embodiment, the removal operation of the screen 170 of the projection unit 100B of FIG. 8 is described hereinafter. As shown in FIG. 9, the screwdriver 230 is inserted in the openings 183 of the fixed holder frame 180b and the frame member 161b of the projection unit 100A and the screw 240 of the detachable holder frame 180a of the projection unit 100B is removed. Then, the holder frame 181a is detached from the frame member 161a.

Figure 12:
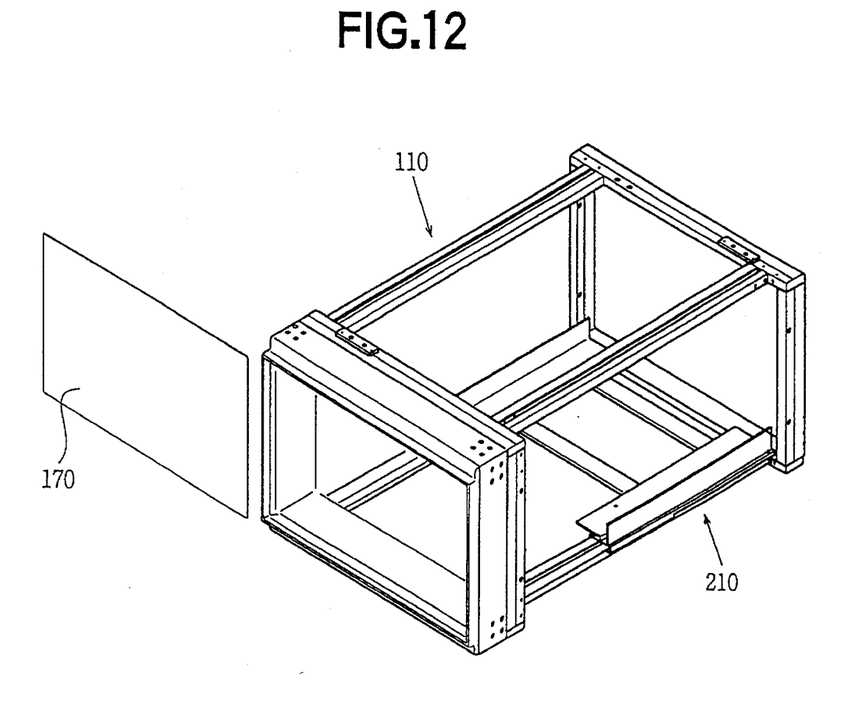
FIGS. 12, 13, 14 and 15 are explanatory views showing a mounting process of the projector in the cabinet at the front.

Similarly, the screwdriver 230 is inserted into openings 183 of the fixed holder frame 180d and the frame member 161d of the projection unit 100C to disengage the screw 240 from the detachable holder frame 181c of the projection unit 100B. Then, the holder frame 181c is pulled out of the frame member 161c. Thereafter, the screen 170 is pulled out in the upward direction to be removed from the cabinet 110 as shown in FIG. 12.

Figure 13:
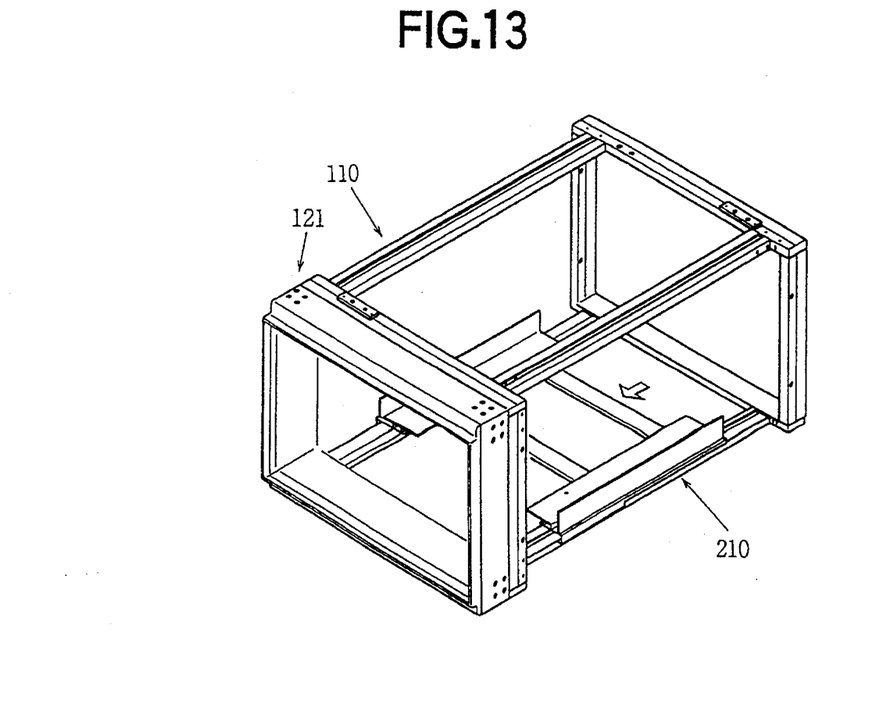
Figure 14:
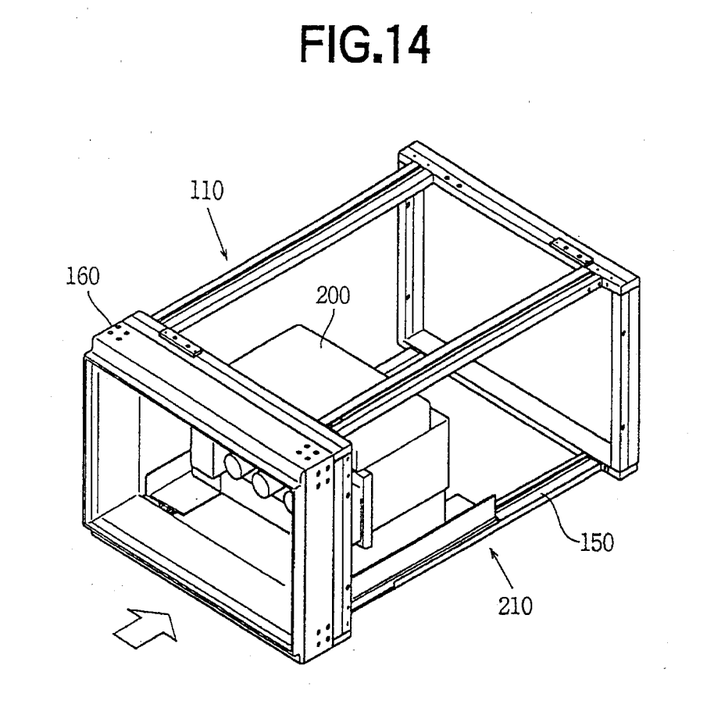
Figure 15:
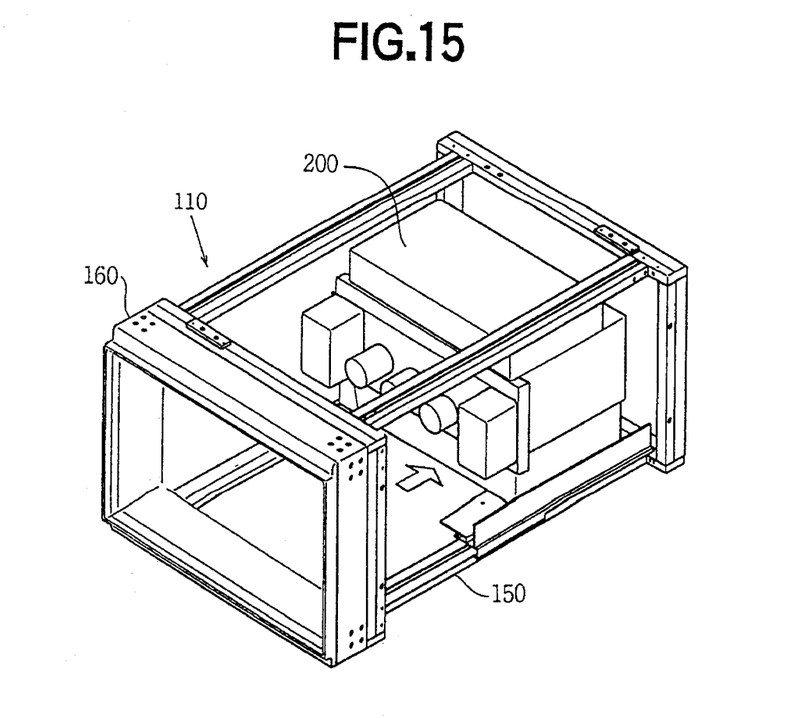

Table 210 is pulled in the forward direction as shown in FIG. 13. Before pulling out the table from the front frame 121, stoppers on the lower frame members 150 and the positioning plates 217 on the sliders 211 are removed. The table 210 is pulled out of the front frame 121 and the projector 200 is mounted on the table 210 at the rear portion thereof. Then, the table is pushed in the cabinet as shown in FIG. 14 to the rear portion of the cabinet as shown in FIG. 15. The positioning plates 217 are secured to the sliders 211 and the projector 200.

Then, the screen 170 is attached to the support frame 160 through the holder frames in a reverse order to the removal. Namely, the lower and left side peripheries of the screen is engaged with the engaging projections 181b and 181d of the fixed holder frames 180b and 180d. The detachable holder frames 180a and 180c are inserted into spaces of the frame members 161a and 161c and the engaging lugs 182a and 182c are engaged with the upper and right side peripheries of the screen. The holder frames 180a and 180c are secured to the frame members 161a and 161c with screws 240 which are inserted into the openings 183 of the adjacent support frames 160 by the screwdriver 230. Thus, the screen is mounted on the support frame 160.

The table 210 is fixed to the lower frame members 150 at a predetermined position of a proper optical path length. Thus, the projector is mounted in the unit.

In FIGS. 6, 7 and 9, each of the frame members 161a to 161d has a comparatively large thickness. Such a large thickness of the frame member may appear to obstruct the light projected from the projector. However, since the thickness is provided for the convenience of explanation, it is not affected on the system actually.

Although the widths of the lower and left engaging lugs are small, those of the upper and right engaging lugs can also be small.

In accordance with the present invention, the projector table is slidably mounted in the cabinet. Thus, the projector can be easily mounted on the rear portion of the cabinet either from the rear or the front. Since the lubricating oil is provided between the table and the lower frame members, the projector on the table is smoothly slidable in the cabinet.

The screen mounted on the cabinet is held by the holder frames of different types. One of the holder frames is detachably engaged with the screen. By disengaging the detachable holder frame from the cabinet, the screen is easily removed from the cabinet. Consequently, the number of parts for mounting the screen is reduced and the attachment and detachment of the screen are easily performed.

Furthermore, the width of the engaging portion of the holder frame exposed on the periphery of the screen is reduced, so that the width of the bordering frame of the screen is reduced.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A multiple projection television system comprised of a plurality of projection units stacked in matrix to form a large television screen, comprising:

each of the projection units having a cabinet, a projector provided in the cabinet, and a screen secured to a front portion of the cabinet;

a mounting frame provided in the cabinet for slidably mounting the projector for movement in forward and rearward directions;

a back of the cabinet being opened so as to allow removing of the projector from the cabinet; and the screen being detachably secured to the cabinet so as to allow removing of the projector from the cabinet.

2. The system according to claim 1 wherein the screen is secured to the cabinet by at least two frame means.

3. The system according to claim 2 wherein one of the frame means is provided to be detached by an operation outside of the cabinet.

4. The system according to claim 3 wherein the frame means comprises four frames for four sides of the screen, each of the frames has an engaging lug for holding the screen.

5. The system according to claim 4 wherein each of the engaging lugs of the upper frame and the engaging lug of one of the side frames has a smaller height than that of the other engaging lug of other side.

6. The system according to claim 5 wherein each of the engaging lugs of the upper frame and one of the side frames is provided so as to allow thermal expansion of the screen.

* * * * *